(12) United States Patent
Shudark et al.

(10) Patent No.: US 9,118,207 B2
(45) Date of Patent: Aug. 25, 2015

(54) METHODS AND SYSTEMS FOR REQUESTING COMPLIANCE WITH A REQUIREMENT OVER A NETWORK

(75) Inventors: Jeffrey B. Shudark, Cumming, GA (US); Mark M. Neill, Decatur, GA (US); David A. Bishop, Woodstock, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 13/363,716

(22) Filed: Feb. 1, 2012

(65) Prior Publication Data

US 2013/0197921 A1    Aug. 1, 2013

(51) Int. Cl.
```
G06Q 30/02     (2012.01)
G06Q 10/10     (2012.01)
G06Q 10/06     (2012.01)
G06Q 30/06     (2012.01)
G06Q 10/08     (2012.01)
H02J 3/14      (2006.01)
H02J 13/00     (2006.01)
```

(52) U.S. Cl.
CPC ............... *H02J 3/14* (2013.01); *H02J 13/0089* (2013.01); *Y02B 70/3225* (2013.01); *Y04S 20/222* (2013.01)

(58) Field of Classification Search
USPC .......................... 700/295; 219/490; 320/109; 340/870.02; 705/1.1–912
See application file for complete search history.

(56) References Cited

U.S. PATENT DOCUMENTS

| | | | |
|---|---|---|---|
| 5,696,695 A | 12/1997 | Ehlers et al. | |
| 6,624,532 B1 | 9/2003 | Davidow et al. | |
| 6,625,532 B2 | 9/2003 | Takatori et al. | |
| 7,606,639 B2 * | 10/2009 | Miyaji | 700/296 |
| 7,765,035 B2 * | 7/2010 | Rodgers | 700/295 |
| 7,778,737 B2 * | 8/2010 | Rossi et al. | 700/295 |
| 8,010,812 B2 * | 8/2011 | Forbes et al. | 713/300 |
| 8,032,233 B2 * | 10/2011 | Forbes et al. | 700/22 |
| 8,082,068 B2 * | 12/2011 | Rodgers | 700/291 |
| 8,103,390 B2 * | 1/2012 | Rodgers | 700/295 |

(Continued)

FOREIGN PATENT DOCUMENTS

| WO | 2013116085 | 8/2013 |
|---|---|---|
| WO | 2013116085 | 10/2013 |

OTHER PUBLICATIONS

NPL: SilverSpring (2011).*

(Continued)

*Primary Examiner* — Jonathan Ouellette
(74) *Attorney, Agent, or Firm* — Kilpatrick Townsend & Stockton LLP (57) ABSTRACT

Systems and methods are disclosed that can be used to broadcast or otherwise send load shed and other requirements over a network to recipients. One exemplary embodiment involves sending a first broadcast message to a first group of recipients. The first broadcast message requests compliance with a requirement but does not require a synchronous reply from the first group of recipients. The first group of recipients are each configured to automatically comply with the requirement in response to receiving the first broadcast message. The exemplary embodiment further involves determining, for example, based on actual load determination, to send a second broadcast message to a second group of recipients different from the first group of recipients and sending the second broadcast message to the second group of recipients, the second broadcast message requesting compliance with the requirement.

17 Claims, 4 Drawing Sheets

(56) References Cited

U.S. PATENT DOCUMENTS

| | | | |
|---|---|---|---|
| 8,116,917 B2* | 2/2012 | Rodgers | 700/291 |
| 8,260,470 B2* | 9/2012 | Forbes et al. | 700/295 |
| 8,307,225 B2* | 11/2012 | Forbes et al. | 713/300 |
| 8,315,717 B2* | 11/2012 | Forbes et al. | 700/22 |
| 8,367,984 B2* | 2/2013 | Besore et al. | 219/490 |
| 8,396,606 B2* | 3/2013 | Forbes et al. | 700/295 |
| 8,700,187 B2* | 4/2014 | Forbes, Jr. | 700/22 |
| 2007/0021874 A1* | 1/2007 | Rognli et al. | 700/295 |
| 2008/0272934 A1* | 11/2008 | Wang et al. | 340/870.11 |
| 2012/0229089 A1* | 9/2012 | Bemmel et al. | 320/109 |

OTHER PUBLICATIONS

Chen, Lijun et al., "Two Market Models for Demand Response in Power Networks", Engineering & Applied Science Division, California Institute of Technology, 10/00/2010, 6 pages.

Mechenbier, Jeff et al., "Load-Shedding Scheme Protects Utility from Voltage Collapse", Transmission & Distribution World, Dec. 1, 2004, 6 pages.

Yao, L. Chang et al., "An Iterative Deepening Genetic Algorithm for Scheduling of Direct Load", Powers Systems, IEEE Transactions, 8/00/2005, 8 pages.

PCT/US2013/023039; "International Preliminary Report on Patentability", Aug. 14, 2014, 5 pages.

International Patent Application No. PCT/US2013/023039, International Search Report & Written Opinion, mailed Jul. 29, 2013, 7 pages.

MX/A/2014/008687, "Office Action (Redacted)", May 15, 2015, 4 pages.

* cited by examiner

METHODS AND SYSTEMS FOR REQUESTING COMPLIANCE WITH A REQUIREMENT OVER A NETWORK

TECHNICAL FIELD

The embodiments disclosed herein relate generally to electronic devices and networks, and relate specifically to devices and systems used to broadcast or otherwise send load shed and other requirements over a network to recipients.

BACKGROUND

Electric utilities provide power using systems such that under normal system conditions there are adequate generating and transmission capacities to meet load requirements. Detection systems are used to account for those generally rare conditions in which the system's capability is exceeded. Such systems monitor a system's loading levels and reduce loading in certain circumstances. Specifically, load shed processes sense overload conditions, and shed enough load to relieve the overloaded system before problems such as equipment damage or shutdown occur.

When a load shed event request is made, there is a window of time in which the utility must comply with and verify the load reduction. Responding quickly, for example within minutes, can reduce or prevent equipment damage, shutdown, and other issues. Reducing load in large service areas can require requesting a large number of energy consumers to cease or reduce consumption and confirming compliance with such requests. The scale of these requests in an exemplary large service area can involve on the order of 200,000 to 2,500,000 or more individual energy consumers. Existing techniques for load shed requesting and confirmation involve acknowledgement of load shed on a per-device basis. Such acknowledgements, in very high volume, can result in reducing the performance of the information network that is used and the device or devices that are used to control the messaging. In some circumstances, such reduced performance may delay receipt of other vital messages, instructions, and alerts.

SUMMARY

Systems and methods are disclosed that can be used to broadcast or otherwise send load shed and other requirements over a network to recipients. One exemplary embodiment involves sending a first broadcast message to a first group of recipients. The first broadcast message requests compliance with a requirement but does not require a synchronous reply from the first group of recipients. Some or all of the devices of the first group of recipients are each configured to automatically comply with the requirement in response to receiving the first broadcast message. The exemplary embodiment further involves determining to send a second broadcast message to a second group of recipients different from the first group of recipients and sending the second broadcast message to the second group of recipients, the second broadcast message also requesting compliance with the requirement.

These exemplary aspects are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE DRAWINGS

These and other features, aspects, and advantages of the present disclosure are better understood when the following Detailed Description is read with reference to the accompanying drawings, wherein.

DETAILED DESCRIPTION

Systems and methods are disclosed that can be used to broadcast or otherwise send load shed and other requirements over a network to recipients. Broadcast messages are sent to a subset of the recipient devices on the network and immediate acknowledgement is not required even though immediate compliance may be desired. For example, if an electric utility desires to shed load quickly it may distribute a broadcast message to a subset of recipients who have previously agreed to automatically comply with such a message. Because the electric utility can assume compliance from devices that receive such a message, it does not need to receive immediate acknowledgement. Instead, it can assume that many, if not all, of the recipients will comply and estimate an expected amount of reduced load based on that expected compliance. To verify this assumption, the system may test actual load shed, for example, using a small number of transactions that interrogate the system infrastructure. Actual compliance information can be gathered asynchronously to prevent bulk traffic on the network.

Another aspect of certain embodiments provides an iterative approach to sending broadcast request messages to different groups of users. Users may be grouped based on different types of compliance. For example, a first group of recipients may agree to automatically comply with requests, a second group may agree to consider complying on a case-by-case basis in exchange for compensation received for each compliance, and a third group may specify that they do not wish to comply with such requests unless it is otherwise unavoidable. In the context of the above load shed example, an iterative approach may be used in requesting compliance from different user groups to shed load until a goal load shed is reached or determined not reachable.

One exemplary embodiment categorizes electric utility users into three groups. The first being a group that is incentivized on a monthly basis regardless of whether or not they are called into participation, referred to in this example as Class A. Second, there may be customers who are incentivized a small amount on a per participation basis, referred to in this example as Class B. A third group may be incentivized at much more expense for participation, perhaps requiring compensation for inconvenience caused for example as a result of having to shut down a production line, referred to in this example as Class C.

When a request comes to the system, either from internal need or external, first the infrastructure is queried to determine the actual current load on the electric grid. Then a broadcast message is sent to Class A devices. These Class A devices do not need to send back immediate acknowledgement of participation. In one embodiment, some or all of the Class A devices do not send back an immediate, i.e., synchronous, reply. Instead, the information is logged by the devices and sent back to the system at a later time, for example, with their standard up-stream, consumption reporting communications sent to a head end system. Not all of the devices will necessarily comply with the request. As example, depending on the system configurations which may vary amongst different embodiments, some of the Class A devices may not receive the request or some of the Class A devices may be permitted to opt out, for example, in certain extraordinary conditions. It may be advantageous in some embodiments to have a group of devices that comply automatically at least is some conditions (if not in all conditions) to a request for compliance with a requirement.

After sending a request to the Class A devices, the system, after waiting for a period to allow time for compliance, for example waiting for propagation, randomization, etc., will measure to determine whether any additional messages need to be sent, for example, by again interrogating the system infrastructure to determine realized load shed and whether such load shed is sufficient. The system need not wait to receive acknowledgments or other replies prior to making such a determination. Interrogating such an exemplary system infrastructure or grid and determining whether additional load shed requests are needed may be determined using actual data and may take into account statistical information that is tracked as to typical load fluctuations based on the time of day and year. For example, if a 15 MW load shed was called for and typically load historically changes by 2 MW during a 5 minute window at this time/day, then the target will be 17 MW. If the target was reached as determined by the interrogation, then the system can respond that it was able to comply with the load shed target.

Because this exemplary technique does not require receiving synchronous replies from recipient devices, such devices do need to send such replies. Issues created by the flooding of the network with such replies can be reduced or avoided completely if some or all of the recipient devices do not send replies back immediately upon receiving the request for compliance. In addition, some or all of the devices can include an acknowledgement or other reply instead as part of another regularly scheduled message such as a message reporting utility consumption. Reducing or avoiding the sending of separate, synchronous acknowledgement messages can reduce network traffic and reduce the central processing requirements, for example, requiring, in some embodiments, many orders of magnitude fewer packets to be received by a head end system.

If the target load shed is not reached after the Class A request, the system may make a determination whether or not to initiate a Class B request. Assuming that the system will continue to attempt to comply with its target, a broadcast event is sent to Class B devices. Again after waiting for compliance, for example, waiting for propagation, randomization, etc., the system may interrogate the infrastructure to determine realized load shed and compare realized load shed with target load shed. If the target is not reached, the process can continue with additional requests being sent to Class C devices, Class D devices (if such a class is used), etc, and otherwise as may be appropriate or needed. If the system is ultimately not able to comply with the load shed requirement after iteratively sending the messages to the various groups of recipients, the system can report the failure to reduce the load to the target as may be appropriate.

Figure 1:
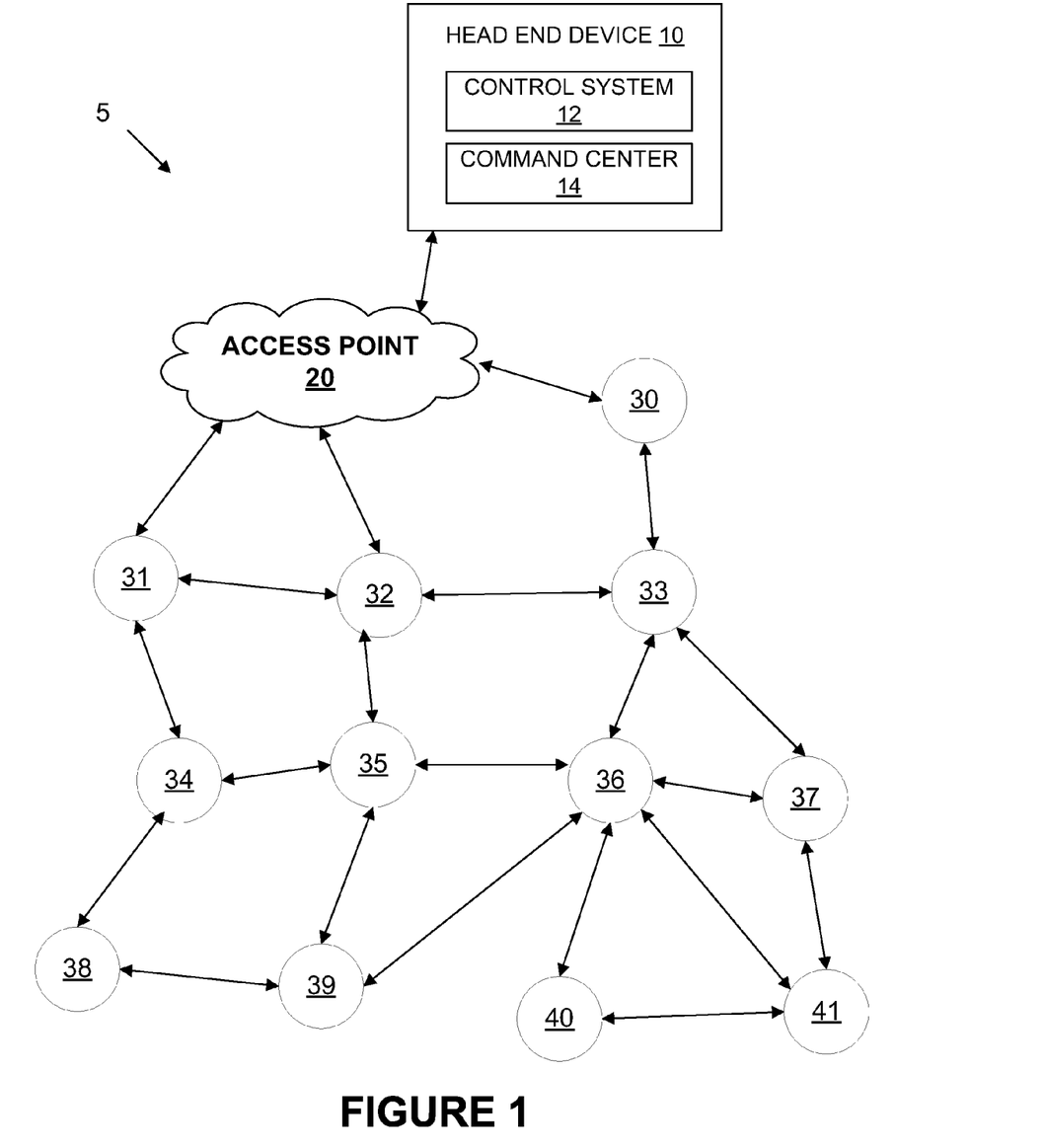
FIG. 1 is a system diagram illustrating an exemplary AMI-based, mesh network in which exemplary recipients can be accessed.

FIG. 1 is a system diagram illustrating an exemplary AMI-based, mesh network in which exemplary recipients can be accessed. Other embodiments may involve alternative networks and systems. The network 5 shown in FIG. 1 comprises a head end device(s) 10 that includes one or more processors (not shown) executing instructions stored in memory or other computer readable medium (not shown) which may store historical load data, meter reading data, customer data, other relevant data, and messaging logic embodied as a command center 14 and load shed software embodied as a control system 12, etc.

As is known to one of skill in the art, applications and content may be resident in any suitable computer-readable medium and execute on any suitable processor. For example, head end device 10 may comprise a computer-readable medium such as a random access memory (RAM) coupled to a processor that executes computer-executable program instructions and/or accesses information stored in memory. Such a processor may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium or other memory may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, and JavaScript.

The network 5 further comprises an exemplary access point 20. The head end device is shown separate from the access point 20 but could alternatively be combined at or with access point 20 at a single location and/or in a single device. The network 5 further comprises other devices, referred to herein as nodes 30-41. The nodes 30-41 work together to create a mesh network in which each node generally comprises a radio that can speak to and respond to neighboring radio devices of neighboring nodes. In the case of an AMI system, at least some of such nodes are at an endpoint and may comprise or connect to one or more endpoint devices such as a utility meter, appliance, environmental condition sensor, or analysis device. Other nodes may simply function as communication devices and thus may not themselves comprise or connect to an endpoint device.

Broadcast messages can be sent to the nodes 30-41 of the network 5. The head end system 10, e.g., via command center 14, may send and manage the sending of messages to the nodes 30-41. In an alternative embodiment, broadcast messages could be sent and managed via a secondary system managed, for example, by a utility via an integration application programming interface (API).

Generally, a node may interact with an endpoint device, act as part of the network, or both, and may do so simultaneously. The radio of each node may have a programmable logic controller (PLC)-like device. Such a device can enable the radio to function like a small computer, carrying out appropriate computing and command functions. Thus, intelligence in some or all of the radios may be used to delegate and distribute messages throughout the network 5. The radio may, but need not necessarily, allow two-way communication.

As an example of a utility monitoring network, each node of network 5 that comprises or connects to an endpoint may collect information about utility consumption at that endpoint and send such information through the network 5 to an access point 20 and/or head end device 10, where it may be collected by a utility company, for example, for billing and/or monitoring purposes. As a more specific example, an endpoint device radio may generate a packet of data that is transmitted to some destination, such as an access point destination. The packet may be addressed to the destination and entered into the network. The data packet traverses the network by hopping from radio to radio (node to node) in the direction of the destination-addressed radio. The route chosen for traversing the network may be dynamic and/or may employ routing. Generally, the network 5 will attempt to minimize the number of hops to increase transmission speed.

Nodes may send messages to other nodes and/or to a head end device 10 which is located at or accessible from exemplary access point 10. Conversely nodes may receive messages such as broadcast messages sent from head end 10. The radio and/or other components at a node of the network may be battery-powered, line-powered, or powered by any other suitable power source and attached via any suitable connection. Nodes will also generally comprise a time-keeping component such as a crystal oscillator.

Figure 2:
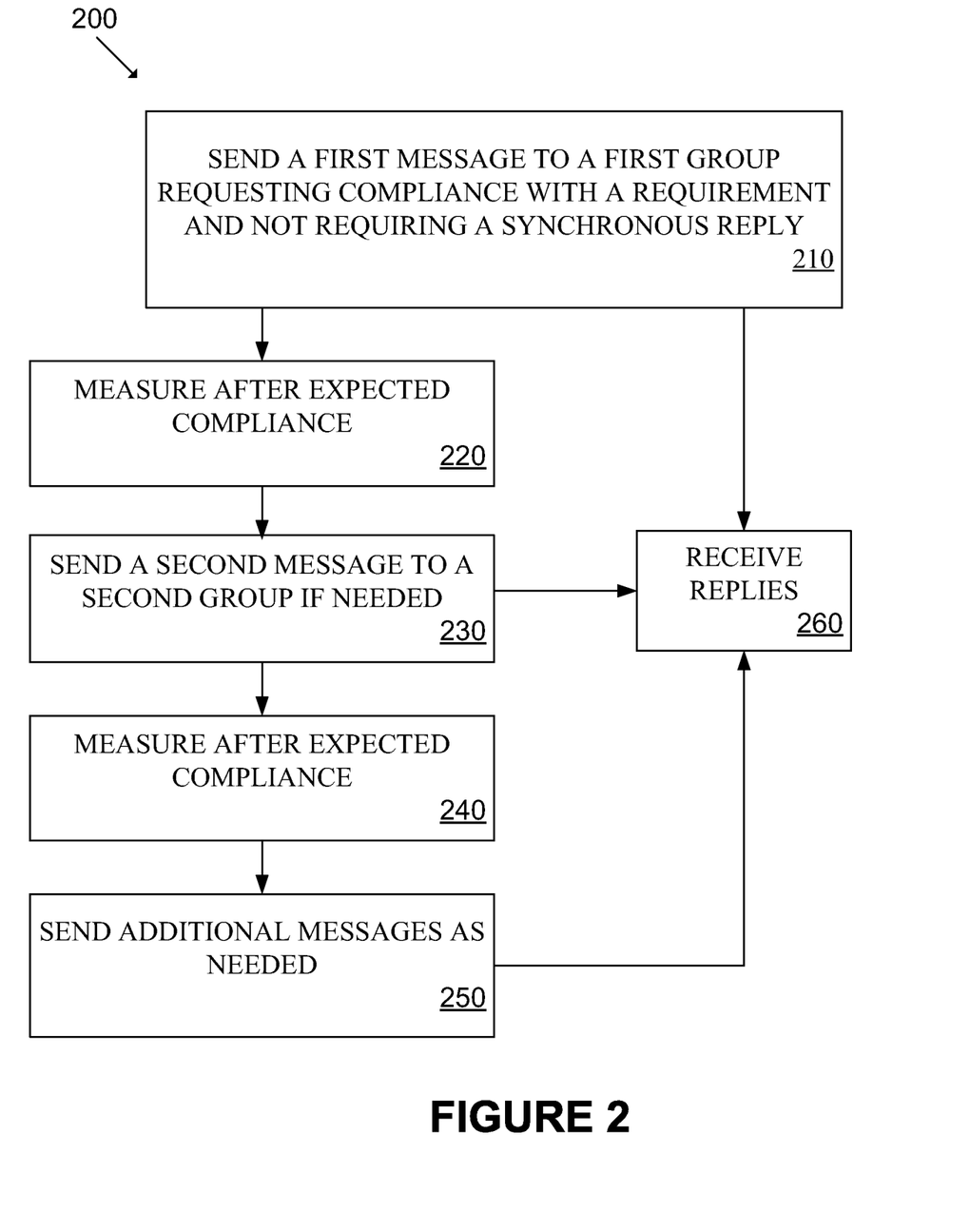
FIG. 2 is a flow diagram illustrating an exemplary method of requesting compliance with a requirement.

FIG. 2 is a flow diagram illustrating an exemplary method 200 of requesting compliance with a requirement. Such a method 200 could be carried out by one or more devices, for example, by head end device 10 of FIG. 1. Alternative implementations of the exemplary method 200 are of course possible.

The exemplary method 200 involves sending a first message to a first group requesting compliance with a requirement and not requiring a synchronous reply, as shown in block 210. For example, control system 12 of FIG. 1 may determine to send such a message to a subset of the nodes 30-41. The message may be sent as a broadcast message that is propagated through the nodes 30-41 of the network 5 to reach the subset that are part of the first group. The exemplary method 200 further comprises measuring after expected compliance, as shown in block 220. This may involve testing via a central device such as head end system 10. For example, if the requirement reduces consumption of electric or another utility, the central device may perform a test to determine whether the actual reduction on the overall utility provisioning system was sufficient.

The exemplary method 200 further involves sending a second message to a second group if needed, as shown in block 230. For example, in the example of a requirement requiring reduced utility consumption, the system may send an additional message requesting that additional recipients also reduce consumption if a target reduction was not achieved after sending the first message. The exemplary method 200 further comprises again measuring after expected compliance as shown in block 240. This may again involve testing via a central device such as head end system 10. For example, if the requirement reduces consumption of electric or another utility, the central device may again perform a test to determine whether the actual reduction on the overall utility provisioning system was sufficient. Additional messages may be sent as needed, as shown in block 250.

In the exemplary method 200 of FIG. 2, messages are sent to at least some recipients who are not required to reply immediately with synchronous replies. The reduced number of replies, as compared to prior compliance request techniques, may reduce the chances of flooding of the message network with such replies.

The exemplary method 200 involves receiving replies as shown in block 260 in response to the sending of the various possible request messages. Replies may or may not be asynchronous. In this example, the replies are asynchronous and there is no requirement that the system performing the exemplary method 200 wait to receive any of these replies before proceeding. Thus, the second message can be sent to the second group prior to receiving replies from the first group. Some or all of the recipient devices need not comply at all in certain embodiments. If some or all of the recipient devices provide an acknowledgement or other reply, such devices can include such a reply as part of another regularly scheduled message such as a message reporting utility consumption. Reducing or avoiding the sending of separate, synchronous acknowledgement messages can reduce network traffic and reduce central processing requirements.

Figure 3:
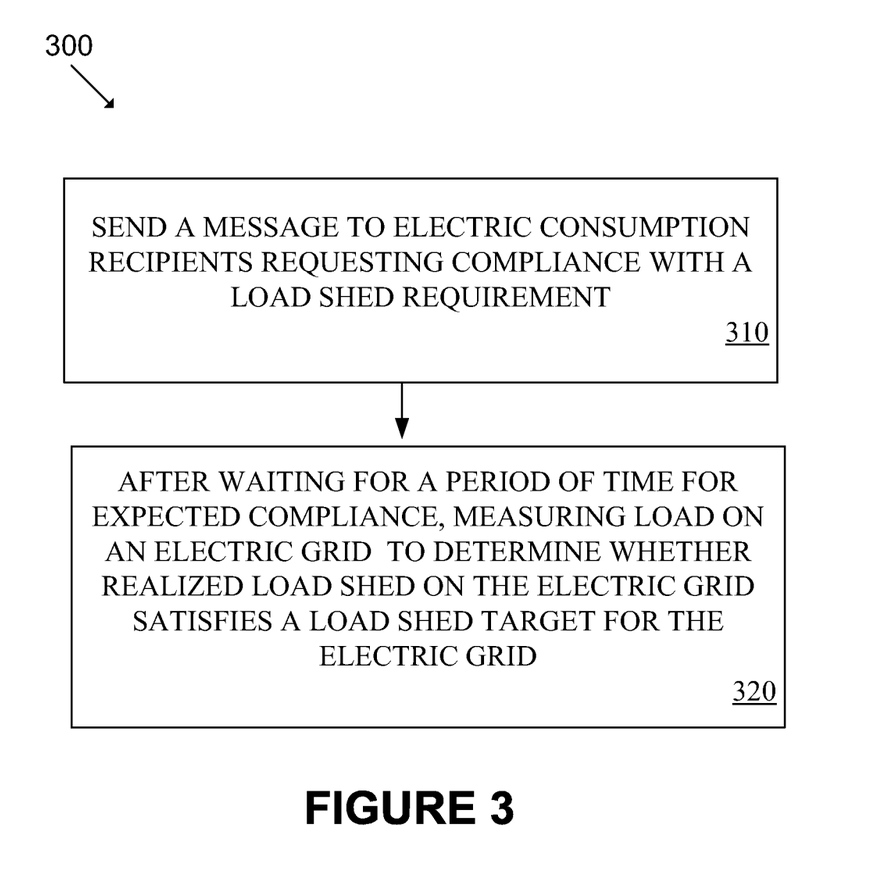
FIG. 3 is a flow diagram illustrating an exemplary method of requesting compliance with a load shed requirement.

FIG. 3 is a flow diagram illustrating an exemplary method 300 of requesting compliance with a load shed requirement. Such a method 300 could carried out by one or more devices, for example, by head end device 10 of FIG. 1. Alternative implementations of the exemplary method 300 are of course possible.

The exemplary method 300 involves sending a message to electric consumption recipients requesting compliance with a load shed requirement, as shown in block 310. The message may indicate that a synchronous reply is not required from some or all of the recipients. Additionally or alternatively, some or all of the recipients may be configured to not send a synchronous reply to the message. In one embodiment, at least some of the recipients are configured to automatically comply with the load shed requirement by reducing load in response to receiving the message and to not send a synchronous reply to the message.

The exemplary method 300 further involves, after waiting for a period of time for expected compliance, measuring load on an electric grid providing electric to determine whether realized load shed on the electric grid satisfies a load shed target for the electric grid, as shown in block 320. If the target is not satisfied, appropriate additional actions may be taken. The target load shed may be determined based on real time information and statistical information, for example, taking into account size of electric grid, estimates of typical customer usage, seasonal information, time of day information, and any other appropriate information.

Figure 4:
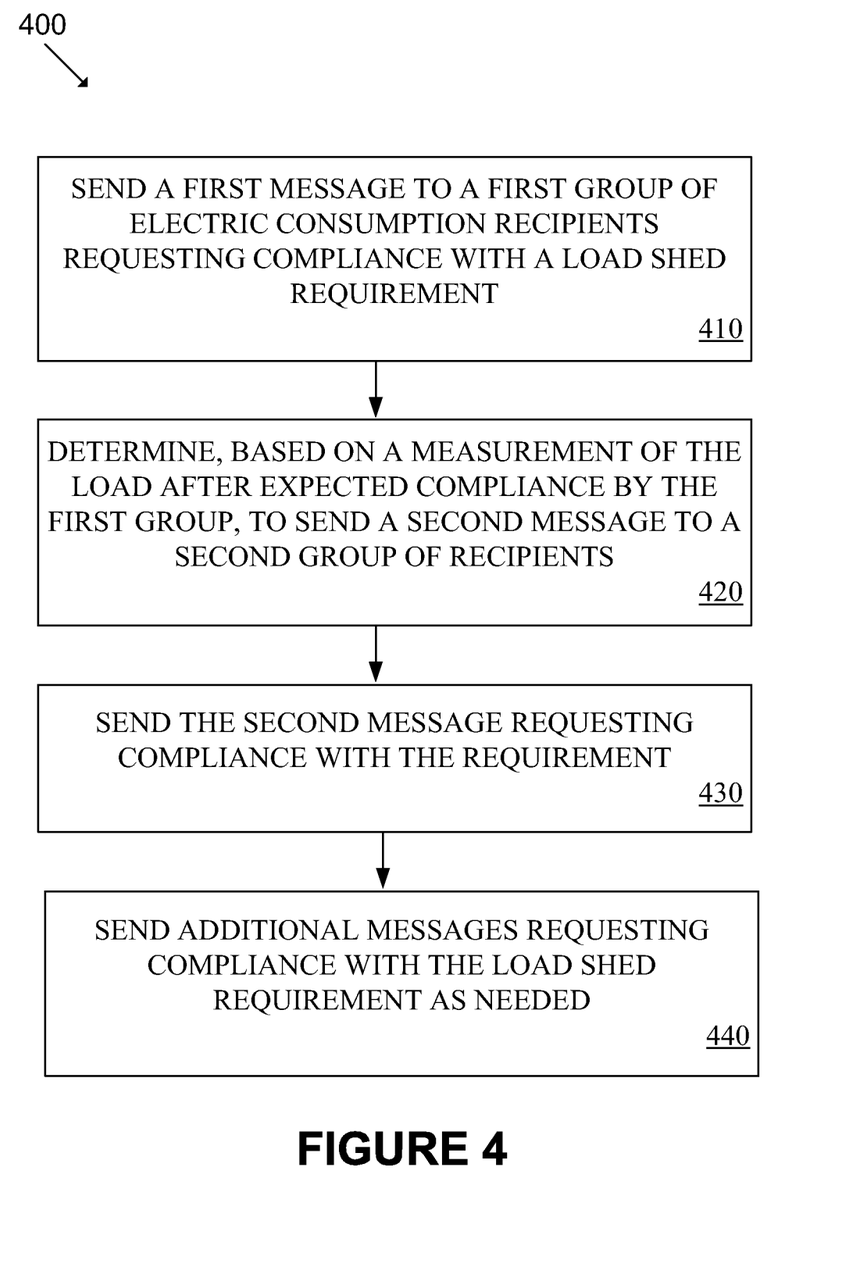
FIG. 4 is a flow diagram illustrating another exemplary method of requesting compliance with a load shed requirement.

FIG. 4 is a flow diagram illustrating another exemplary method 400 of requesting compliance with a load shed requirement. Such a method 400 could carried out by one or more devices, for example, by head end device 10 of FIG. 1. Alternative implementations of the exemplary method 400 are of course possible.

The exemplary method 400 involves sending a first message to a first group of electric consumption recipients requesting compliance with a load shed requirement, as shown in block 410 and determining, based on a measurement of the load after expected compliance by the first group, to send a second message to the second group of recipients, as shown in block 420. Asynchronous replies may be received from the first group. For example, each recipient in the first group may asynchronously reply by including a reply to the request in a scheduled information message such as a message reporting consumption of electric by that recipient. The determining to send a second message to the second group of recipients illustrated in block 420 may occur independently of and thus prior to receiving any such replies.

The exemplary method 400 further involves sending the second broadcast message to the second group of recipients, as shown in block 430. The second broadcast message may request compliance with the load shed requirement. In one embodiment, the second group of recipients is configured to individually opt in or out of complying with the requirement in response to receiving the second broadcast message. In an exemplary embodiment, a first incentive is provided to the first group of recipients for agreeing to automatically comply with received requirements and a second, different incentive is provided to the second group of recipients based upon compliance with individual compliance requests.

The exemplary method 400 further involves sending any additional messages requesting compliance with the load shed requirement as needed, as shown in block 440. For example, the method 400 may involve sending a third message to a third group of recipients who have different response types and/or incentives for compliance than the first or second groups of recipients.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art. An alternative involves classifying recipients into different groups and determining from which group or groups compliance should be requested based real time and/or historical information. For example, an initial request for compliance may be sent to two groups, e.g., Class A and Class B recipients, based on a determination that expected compliance from sending to Class A alone would be insufficient to achieve a desired target. As a specific example, an electric utility provider may determine that it needs to cut electric consumption by X amount, determine that requesting a load shed from Class A customers is not going to be enough, and send an initial message requesting load shed by both Class A and Class B recipients. Such a determination may take into account historic and/or statistical data. Over time a system can track compliance to obtain class-specific compliance statistics and use that information in load shed determinations.

The techniques disclosed herein are not limited to use in the context of an electric utility provider and can adapted for and otherwise used in the context of other utilities such as gas and water, as well as in the context of controlling home area networks (HANs), smart devices, monitoring devices, cooling and heating systems, and other contexts in which compliance with broadcast messages in desired and/or reduction of reply messages is desired. As one example, some water utility customers may agree to automatically comply with specific requests, for example, requests that automatically turn off sprinklers and other outdoor water use.

GENERAL

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform or other electronic device, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A device can include any suitable arrangement of components that provide a result conditioned on one or more inputs. Suitable computing devices include multipurpose microprocessor-based computer systems accessing stored software, that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

The inherent flexibility of network systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel. When data is obtained or accessed as between a first and second system or components thereof, the actual data may travel between the systems directly or indirectly. For example, if a first device accesses data from a second device, the access may involve one or more intermediary devices, proxies, and the like.

The technology referenced herein also makes reference to communicating data between components or systems. It should be appreciated that, unless more specifically identified, such communications may occur over any suitable number or type of networks or links, including, but not limited to, a dial-in network, a local area network (LAN), wide area network (WAN), public switched telephone network (PSTN), a mesh network, an AMI network, a power line carrier network (PLC), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
    sending a first broadcast message to a first group of recipients, the first broadcast message requesting compliance with a requirement and not requiring a synchronous reply from the first group of recipients, wherein the requirement requests that recipients reduce electric consumption, wherein, based on the first group of recipients previously agreeing that compliance is not optional, the first group of recipients automatically complies with the requirement by reducing electric consumption in response to receiving the first broadcast message;
    based on a measurement of load on an electric grid identifying that a load shed target has not been satisfied after expected compliance with the requirement by the first group, determining, by a processor, to send a second broadcast message to a second group of recipients different from the first group of recipients;
    sending the second broadcast message to the second group of recipients, the second broadcast message requesting compliance with the requirement, wherein compliance with the requirement for at least some recipients of the second group is optional; and
    receiving asynchronous replies from the first group, wherein each recipient of the first group asynchronously replies by including a reply in an already-scheduled information message.

2. The method of claim 1 wherein the requirement requests recipients adjust a controllable element of a home area network controlling one or more appliances or devices located in a home.

3. The method of claim 1 wherein the already-scheduled information message is a message reporting consumption of electric by each respective recipient.

4. The method of claim 1 wherein determining to send the second broadcast message occurs independent of receiving the replies from the first group, wherein determining to send the second broadcast message is based upon measurements made by devices that are not associated with the first group of recipients.

5. The method of claim 1 wherein the second group of recipients can individually opt out of complying with the requirement in response to receiving the second broadcast message.

6. The method of claim 5 wherein an incentive is provided to the first group of recipients for agreeing to automatically comply with received requirements, wherein the incentive is not provided to the second group of recipients.

7. The method of claim 5 wherein:
    a first incentive is provided to the first group of recipients for agreeing to automatically comply with received requirements, wherein the first incentive is not provided to the second group of recipients; and
    a second incentive is provided to the second group of recipients based upon compliance with individual compliance requests.

8. The method of claim 1 further comprising:
    determining to send a third broadcast message to a second group of recipients different from the first group of recipients and different from the second group of recipients; and
    sending the third broadcast message to the third group of recipients, the third broadcast message requesting compliance with the requirement; and
    wherein different compliance incentives are provided for compliance to each of the first group, the second group, and the third group.

9. A method comprising:
    sending a first broadcast message to a first group of electric consumption recipients, the first broadcast message requesting compliance with a load shed requirement and not requiring a synchronous reply, wherein at least some of the recipients in the first group previously agreed that compliance is not optional and are configured to automatically comply with the load shed requirement by reducing load in response to receiving the first broadcast message and to not send a synchronous reply to the first broadcast message;
    after waiting for a period of time for expected compliance, measuring load on an electric grid providing electric to the first group of electric consumption recipients to determine whether realized load shed on the electric grid satisfies a load shed target for the electric grid;
    determining, by a processor, based on the measuring, to send a second broadcast message to a second group of recipients different from the first group of recipients;
    sending the second broadcast message to the second group of recipients, the second broadcast message requesting compliance with the load shed requirement, wherein the second group of recipients can individually opt out of complying with the requirement in response to receiving the second broadcast message; and receiving asynchronous replies from the first group, wherein each recipient in the first group asynchronously replies by including a reply in an already-scheduled information message, wherein the sending and measuring are performed by a processor executing stored instructions.

10. The method of claim 9, wherein the already-scheduled information message is a message reporting consumption of electric by each respective recipient.

11. The method of claim 9 wherein determining to send the second broadcast message occurs independent of receiving the replies from the first group.

12. The method of claim 9 wherein:
a first incentive is provided to the first group of recipients for agreeing to automatically comply with received requirements, wherein the first incentive is not provided to the second group of recipients; and
a second incentive is provided to the second group of recipients based upon compliance with individual compliance requests.

13. A system comprising:
a control system a processor configured to execute instructions to access recipient information, identify load shed events, and initiate sending of broadcast messages to address load shed events, wherein, in response to identifying an occurrence of a load shed event, the processor of the control system configured to execute instructions to:
identify a first group using the recipient information;
initiate sending of a first message to the first group requesting compliance with a load shed requirement;
determine, based on a measurement of load on an electric grid providing electric to the first group after expected compliance by the first group with the load shed requirement, whether realized load shed on the electric grid satisfies a load shed target for the electric grid, and
determine, based on whether the realized load shed on the electric grid satisfies the load shed target for the electric grid, whether to send a second message to a second group, the second group different from the first group;
a command center configured to send the broadcast messages via a mesh network; and
recipients connected via the mesh network to the command center, the recipients comprising the first group, wherein, based on the first group of recipients previously agreeing that compliance is not optional, recipients of the first group are configured to receive broadcast messages, automatically comply with messages requesting compliance with load shed requirements by reducing electric consumption, and asynchronously reply by including a reply in an already-scheduled information message.

14. The system of claim 13 wherein the control system and command center are integrated at a head end device.

15. The system of claim 13 wherein the recipient information comprises storage of meter reading data.

16. The system of claim 13 wherein the control system is further configured to access historical load information and use historical load information to determine whether to send the second message.

17. The system of claim 13 wherein the control system is configured to identify which recipients are in the first group using the recipient information by using recipient class information in the recipient information to identify recipients that previously agreed to automatically comply with requests in exchange for receiving an incentive.

* * * * *